G. W. BULLEY.
ELECTRIC TRACTOR.
APPLICATION FILED FEB. 11, 1915.
1,217,702.
Patented Feb. 27, 1917.
2 SHEETS—SHEET 1.
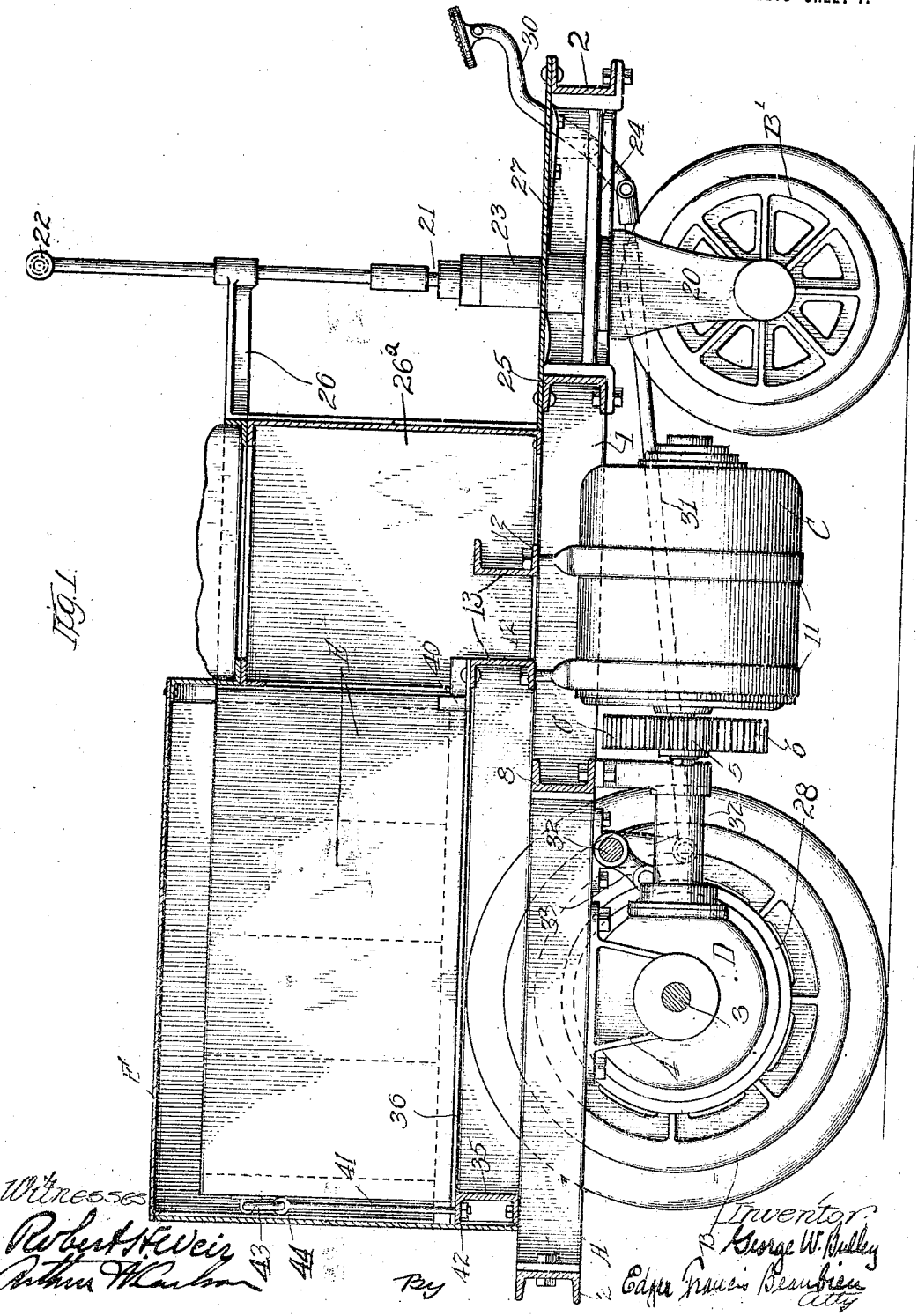

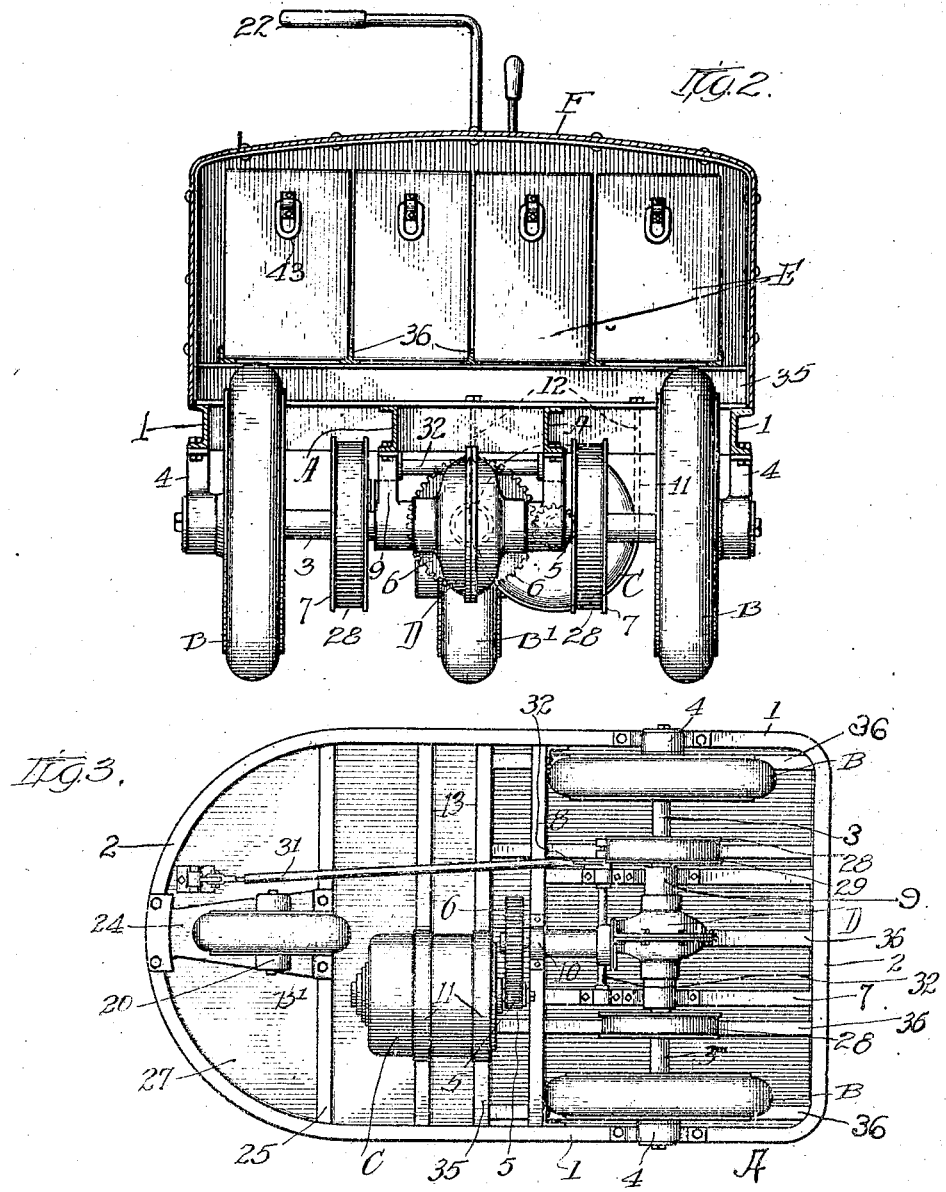

UNITED STATES PATENT OFFICE.

GEORGE W. BULLEY, OF CHICAGO, ILLINOIS, ASSIGNOR TO MERCURY MANUFACTURING COMPANY, OF CHICAGO, ILLINOIS, A CORPORATION OF ILLINOIS.

ELECTRIC TRACTOR.

1,217,702.  Specification of Letters Patent.  Patented Feb. 27, 1917.

Application filed February 11, 1915. Serial No. 7,496.

*To all whom it may concern:*

Be it known that I, GEORGE W. BULLEY, a citizen of the United States of America, and resident of Chicago, Cook county, Illinois, have invented a certain new and useful Improvement in Electric Tractors, of which the following is a specification.

My invention relates to improvements in motor vehicles, and has more particular reference to improvements in vehicles of the electric tractor type adapted for use as a pulling or hauling unit.

One of the objects of my invention is to provide an improved structure of this character which will be simple, durable and reliable in construction and effective and efficient in operation. Other objects of my invention will appear hereinafter.

Referring to the drawings—

Figure 1 is a view in vertical longitudinal section of an electric tractor embodying my invention, some of the parts being shown in elevation;

Fig. 2 is a view in rear end elevation of the structure shown in Fig. 1, the battery housing and frame being shown in section; and Fig. 3 is a bottom plan view of the structure shown in Fig. 1.

My improved tractor is designed more particularly as a pulling or hauling unit—that is to say, it is not necessarily intended to carry a load itself, but rather as a power unit or locomotive so to speak, adapted to the pulling or hauling of a train of load carrying vehicles—and the particular structure shown in the drawings is of the type which is adapted for use in connection with freight or merchandise handling systems about docks, warehouses, freight platforms and the like. In vehicles of this type which are not, in themselves, intended as load-carrying vehicles, it is essential that the maximum tractive effort may be obtained, and my invention is more particularly directed to the accomplishment of this, as well as other desirable results in the construction of a vehicle of this type. The structure shown in the drawings has a frame A which is composed of side channel beams 1 and end channel beams 2, all disposed to lie in a horizontal plane. These side and end beams may, if desired, be constructed of one continuous channel formed to the proper shape, or the frame may be built up of sections, if desired. The rear end of the frame is substantially transversely straight from one side to the other of the frame, while the forward end is preferably arc-shaped or rounded off. The rear end portion of the frame is supported by a pair of wheels of any suitable construction, preferably rubber tired wheels B, the axle 3 of which is journaled in depending bearing brackets 4 secured to the end edge or side of the side beams 1 of the frame. The wheels, as will be noted, are positioned within the confines of the frame adjacent the inner side of the side beams thereof. These wheels constitute the rear supporting means for the structure and also the tractive or driving wheels therefor. The wheels derive their power from a motor C through suitable differential driving mechanism D which is carried by the axle 3 substantially at its center. The motor C carries a pinion gear 5 on its armature shaft which meshes with and drives a larger spur gear 6 on a longitudinally disposed counter-shaft through which the power is transmitted from the motor back to the differential. A pair of longitudinal channel beams 7 are secured at their rear ends to the end channel 2 of the frame, and at their forward ends to a cross or transverse channel beam 8, the beams 7 and 8 being disposed within the plane of the frame itself. The differential casing is supported in bearing brackets 9 fastened to and depending from the longitudinal beams 7, while the bearing 10 for the counter-shaft is dependingly supported from the transverse beam 8. The driving motor C, as shown clearly in the drawings, is positioned beneath the frame A and is suspended or hung in a pair of loop-shaped hanger straps 11, the upper ends 12 of which are bolted or otherwise removably attached to a pair of parallel cross channel beams 13. Both of these beams 13 are positioned above the frame and are securely fastened to the side channels 1 thereof, and one of these beams serves as a battery supporting means which will be described hereinafter. It will be observed, however, that the motor is positioned substantially midway between the forward and rear wheels so that its weight will be substantially equally distributed on all of the wheels. Furthermore, being underslung from the frame in this manner, its effect is to lower the center of gravity of the vehicle, and thereby decrease the tendency of the vehicle to tip over when turning sharp corners at a comparatively high speed. In fact, the entire frame of the vehicle is positioned, as shown more clearly in Fig. 1, below the upper sides of the rear driving wheels, so that a comparatively low, well balanced, vehicle is provided. The forward end of the frame is supported by means of a single wheel B' which is arranged to rotate about a vertical axis for steering purposes. This wheel may be of any suitable construction, and is preferably rubber-tired. It is carried in a yoke 20 from which a steering shaft or post 21 rises vertically and is preferably disposed in alinement with the vertical axis about which said wheel is rotated. This shaft carries at its upper end a suitable hand-lever 22 by which the shaft or post 21 may be rotated to steer the front wheel. The steering shaft 21 is journaled in a comparatively long vertical bearing 23 which is formed on a suitable member or casting 24 disposed longitudinally of the frame and positioned between the forward end channel beam of the frame and the cross channel beam 25, this cross channel beam being fastened at its ends to the side members 1 of the frame preferably positioned within the general plane of the frame. The upper portion of the steering shaft is supported by a suitable bearing arm 26 outstanding from a box-like casing 26ª which extends transversely of the frame and which serves as a seat for the operator. A plate 27 covers the upper side of the frame channels from the seat to the forward end of the frame and provides a suitable unobstructed platform upon which the operator may stand. Any suitable brake mechanism may be provided. In this structure, I have shown the rear axle 3 provided with brake drums 28 surrounded by brake bands 29 of well known construction. These brake bands are operated by a foot-lever 30 placed in a convenient position for the operator, through the medium of a connecting rod 31 and the lever 32ª to which said connecting link is pivotally fastened. The lever 32ª is mounted on a shaft 32 supported in suitable bearings depending from the longitudinal beams 7. This shaft carries two arms 33 which are connected to the brake bands in the ordinary manner. At the rear end of the frame is a transverse channel beam 35 mounted upon the upper side of the side beams 1 of the frame, and similar in construction to the cross beams 13, and one of the beams 13 and the beam 35 support, as clearly shown in Figs. 1 and 2, a plurality of longitudinally disposed angle beams 36 preferably inverted T-shape in section. These angle beams are spaced apart and their horizontal flanges provide supporting edges for the cells E of the storage battery for supplying current to the driving motor. The storage battery may be of any standard or approved type, suitable for the purpose, and comprises preferably a plurality of individual or unit cells E which are arranged, as shown in the drawings, in longitudinal rows, the cells of each row being properly held apart and in place by the vertical flanges of the angle beams. The rows of cells are held against longitudinal movement at their forward ends, preferably by means of abutment plugs 40 fastened to the longitudinal angle beams 36. The rows may be held against longitudinal movement at their rear ends by means of long rods 41, the lower ends of which are passed through holes in the cross beam 35 and provided with nuts 42. The upper ends of these rods may be attached to the end cells in any suitable manner, but since most storage batteries of this character are provided with handles 43, I simply loop the ends 44 of the rods 41 through these handles and thus hold the rows of cells in place. The entire storage battery is preferably covered by a suitable housing F, which, in the present structure, is made of sheet metal, supported on the frame in any suitable manner and preferably made removable so that access may be readily had to the battery. The storage battery is thus positioned on the rear end of the frame above the rear driving wheels and practically its entire weight is sustained by these driving wheels. The weight of the various parts of the structure, and particularly the storage battery, is thus disposed in position where it will be the most effective in obtaining the maximum tractive effort of the rear driving wheels, and in this manner the maximum pulling power of the tractor as a whole is obtained.

What I claim as my invention is:

1. In a vehicle of the class described, the combination of a substantially horizontally disposed flat frame, a pair of driving wheels disposed at the rear of the frame and supporting the rear end of said frame in a position below the tops of the wheels, a single front steering wheel disposed beneath and supporting the forward end of the frame, a motor suspended from and extending below the frame between said rear and forward wheels and connected in driving relation to said rear wheels, and a storage battery mounted on said frame entirely above the rear wheels so as to impose substantially its entire weight upon said rear wheels.

2. In a vehicle of the class described, a horizontally disposed open frame, a pair of driving wheels positioned at the rear of said frame, an axle for said wheels, means supporting the rear end of the frame on the axle in a position considerably below the tops of the wheels, a single steering wheel supporting the forward end of said frame, a steering post connected directly to the single front wheel and rising vertically above said frame, a storage battery housing on the frame above the rear wheels, a storage battery supported within said housing and directly above said rear wheels so as to impose substantially its entire weight upon the rear wheels, and a motor carried by said frame and connected to said rear driving wheels.

3. In a vehicle of the class described, the combination of an open frame embodying side channels, a pair of supporting wheels for the rear end of said frame and extending above the upper side thereof, a cross channel supported on the upper side of said frame, forward and in the rear of the wheels and extending above the tops of the wheels, a storage battery supported by said cross-channels directly above the wheels so as to impose substantially its entire weight on the wheels, and a removable housing covering said battery.

4. In a tractor of the class described, the combination of a flat horizontally disposed open frame comprising side and end beams, a pair of wheels positioned between the side beams of the frame, an axle for said wheels, means supporting the frame on the axle outside of said wheels so that the wheels extend considerably above the top of said frame, a plurality of cross beams arranged to clear the wheels, a storage battery supported on said cross beams directly above the wheels, a single steering wheel disposed beneath and supporting the front end of the frame, a vertically disposed steering fork connected with the wheel and having a vertical bearing in the frame, the axis of which intersects the axis of the steering wheel, and a driving motor supported by the frame but entirely below the frame.

5. The combination of a substantially rectangular open frame disposed horizontally and comprising end and side beams, a pair of rear wheels adjacent the inner sides of said side beams, an axle for said wheels, bearings for the frame mounted on the outer ends of said axle beyond the wheels and supporting the frame close to said axle and below the tops of the wheels, cross beams on the frame reaching a height slightly greater than the tops of the wheels, a storage battery supported by said cross beams just clear of the top of the wheels and directly above said wheels so as to impose substantially its entire weight upon the wheels, a single steering wheel supporting the front end of the frame and disposed entirely within the confines of the frame, a motor suspended and positioned below the frame intermediate the rear wheels and the front steering wheels, and a seat for the operator mounted on said frame forward of the storage battery.

Signed by me at Chicago, Illinois, this 2nd day of Feby., 1915.

GEORGE W. BULLEY.

Witnesses:
   ALB. H. BITZER,
   JOHN W. DUNCAN.